United States Patent [19]
Hazard

[11] Patent Number: 5,533,126
[45] Date of Patent: Jul. 2, 1996

[54] KEY PROTECTION DEVICE FOR SMART CARDS

[75] Inventor: Michel Hazard, Mareil Sur Mauldre, France

[73] Assignee: BULL CP8, Louveciennes, France

[21] Appl. No.: 230,737

[22] Filed: Apr. 21, 1994

[30] Foreign Application Priority Data

Apr. 22, 1993 [FR] France .................... 93 04773

[51] Int. Cl.$^6$ ......................................... H04K 1/00
[52] U.S. Cl. ................. 380/25; 380/23; 380/46; 380/49; 380/21
[58] Field of Search ................. 380/23, 25, 46, 380/49, 21

[56] References Cited

U.S. PATENT DOCUMENTS

| | | | |
|---|---|---|---|
| 4,935,962 | 6/1990 | Austin | 380/25 |
| 5,048,085 | 9/1991 | Abraham et al. | 380/23 |
| 5,148,481 | 9/1992 | Abraham et al. | 380/46 |

FOREIGN PATENT DOCUMENTS

| | | |
|---|---|---|
| 0055986 | 7/1982 | European Pat. Off. . |
| 0216298 | 4/1987 | European Pat. Off. . |
| 0225010 | 6/1987 | European Pat. Off. . |
| 0281059 | 9/1988 | European Pat. Off. . |
| 0409701 | 1/1991 | European Pat. Off. . |
| 2363832 | 3/1978 | France . |
| 2600190 | 12/1987 | France . |
| 2601476 | 1/1988 | France . |

*Primary Examiner*—David C. Cain
*Attorney, Agent, or Firm*—Weingarten, Schurgin, Gagnebin & Hayes

[57] ABSTRACT

This invention concerns a key protection device for smart cards and is characterized by the fact that:

each input user key is coded using a random key and stored;

protection data that corresponds to each coded user key's dependant data is generated and associated to each coded user key;

a detection device is installed on the card that allows the user to verify the stored user key's integrity by comparing the protection data to verification data that is generated using the card's stored user key; and an interlock device that allows the user to block any further calculation using the stored key in the event that the verification data is not identical to the protection data.

14 Claims, 3 Drawing Sheets

KEY PROTECTION DEVICE FOR SMART CARDS

FIELD OF THE INVENTION

This invention concerns a key protection device for smart cards.

BACKGROUND OF THE INVENTION

Smart card security depends on the hardware design of the card circuitry and above all on the cryptographic mechanisms used in the card's operating system. The keys that are used in the cards for symmetric and asymmetric algorithms are hidden. The key's hidden characteristic plays an important role in systems whose security relies on micro calculator cards.

Today, there is a theoretically applicable method that allows the user to determine the contents of a key stored within a smart card. This method successively toggles all non-volatile memory cells (EPROM or EEPROM) that record the stored key's binary elements. This method can be executed using physical or electronic means that allow the logical contents (or the electrical charge) of an elementary memory cell to be modified.

However, in order to execute this type of operation, it is absolutely necessary that the user know the physical order or arrangement of the memory cells on the chip. The user must also be able to ensure correspondence between these physical addresses (defined by a memory chip mask) and the relative or absolute logic addresses that allow the user to access information.

When a memory cell that contains a binary element of a stored key that needs to be identified is found, this cell can be subjected to selective X-ray exposure to alter the contents of the memory cell.

The key contents determining approach consists of performing a calculation using this stored key in order to save the results obtained and then trying to modify the contents of a cell using the method described above (changes are only possible in one direction-load or unload a cell). Next, the preceding calculation is redone. Therefore, if there is no modification of the cell's binary value, the same result is obtained; otherwise, it is modified. Thus, the value of the stored key that undergoes the process can be determined and, by preceding incrementally, the value of the set of bits that make up a key can be determined.

The possibility of fraud becomes even more pronounced for base keys or mother board keys that are used on a number x of cards. Therefore, a user can use the procedure described above, taking one bit from each of these x cards to determine the total number of bits of the base key that are used on each of the x cards.

SUMMARY OF THE INVENTION

The purpose of this invention is to reduce the disadvantages described above. This goal is obtained because the stored key protection feature for smart cards in which each key is coded using a random key contains:

protection data that corresponds to the coded key's dependant data. This protection data is generated and associated with each coded and stored key;

a detection device used on the card that allows the user to verify the integrity of the coded key by comparing the protection data with verification data generated by the card's coded key; and an interlock device that allows the user to block any subsequent calculation using the stored coded key in the event that the verification data is not identical to the protection data.

Another characteristic of this invention is that the protection data is stored in the card's hidden memory area where the coded key is inscribed.

Another characteristic of this invention is that the detection device contains a key correction feature.

Another characteristic of this invention is that the coding algorithm for the coded key is different from the operation algorithm, and is stored in the card's hidden memory area.

Another characteristic of this invention is that the protection data is a checksum.

Another characteristic of this invention is that the protection data is a cyclic redundancy check (C.R.C.).

Another characteristic of this invention is that the protection data is the number of coded key (CCCi) bits (CBVip) having a given value.

Another feature of this invention is that the protection data is a signature (Sip) calculated using a secret key.

Another feature of this invention is that the detection device is an algorithm that is executed by the card's microprocessor.

Another goal of this invention is a smart card that allows the user to overcome some of the disadvantages described above.

This goal is obtained because the smart card contains:

a user key that is coded using a random key;

protection data, corresponding to coded user key dependant data, calculated using a checksum algorithm or a cyclic redundancy check (A.CA.S.C.);

a detection device used on the card that allows the user to verify the integrity of the coded key by comparing the protection data with the verification data that is generated using the card's coded key.

an interlock device that is on the card to block any subsequent calculation using the key in the event that the verification data is not identical to the protection data.

Another goal of this invention is a procedure that includes (after the verification data's integrity has been verified) the key (CCCi) decoding process. This process uses a specific coding and decoding algorithm (A.S.C.C.), a specific random key (C.SP.Di.) and a key save operation that is usable either in the card's random access protected memory area (4) or in a non-volatile protected memory area (3) for the duration of a session.

The final goal of this procedure is the storing of at least one coded key on a card in order to use it in the device described in this patent.

This goal is obtained because the storing of at least one user key includes the following steps:

coding of the non-coded user key (CU) using a specific key-coding algorithm (A.S.C.C.) contained in the card's non-volatile read-only memory and a random key (C.SP.Di.) in order to obtain a coded key (CCCi).

calculation of the protection data using a checksum algorithm or a cyclic redundancy code algorithm (A.S.C.C.) contained in the card's read-only memory and;

saving the coded key (CCCi) and the protection data (SC or CCR) in the hidden area of non-volatile memory.

Another characteristic of this invention is that the storing process also includes the following steps:

loading an input coded key (CCU);

decoding the coded key using a user coding-decoding algorithm (A.C.U.), and a user associated key (CUAi) that is preferably diversified and included on the card in order to obtain the non-coded user key (CU).

BRIEF DESCRIPTION OF THE DRAWINGS

Other characteristics and advantages of this invention will become evident in the following descriptions. These descriptions refer to the enclosed diagrams and flow charts in which.

DETAILED DESCRIPTION OF THE INVENTION

Figure 1:
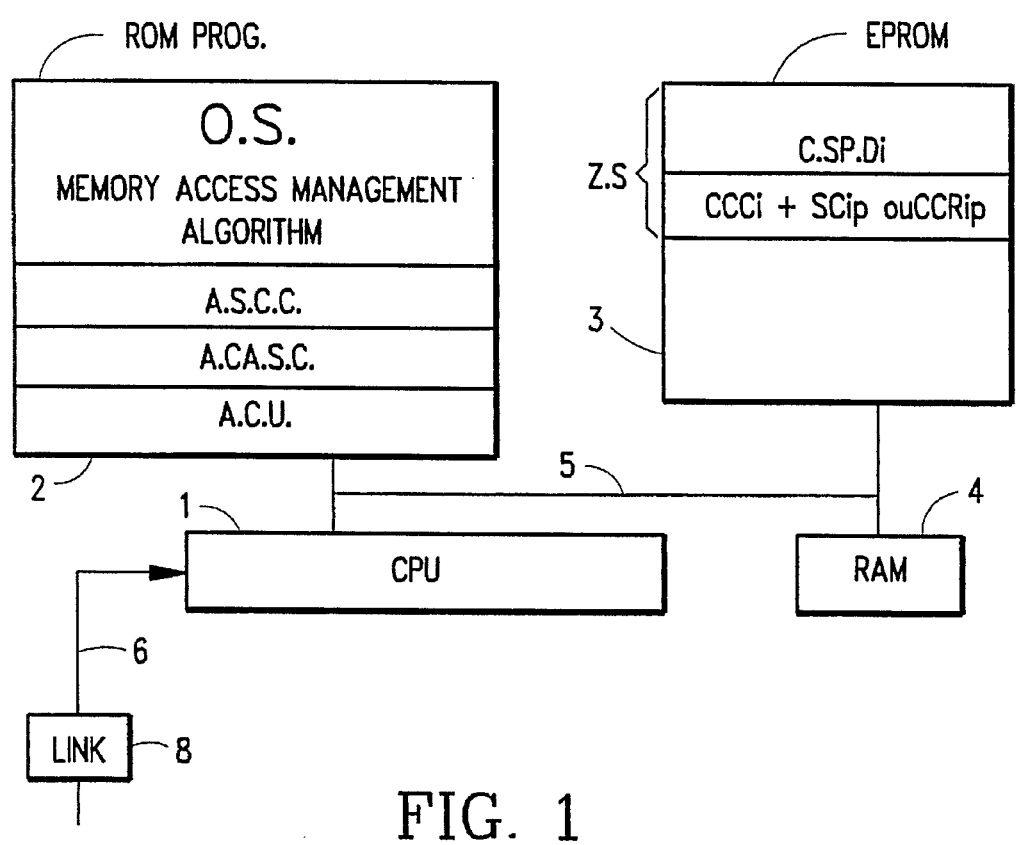
FIG. 1 is a schematic representation of the different elements comprising the protection feature.

As illustrated in FIG. 1, the smart card unit includes an integrated circuit with a microprocessor (1) that is connected by a bus (6) to a ROM type read-only memory (2). This memory contains programs that the unit requires in order to function. The same bus (5) also connects a writable non-volatile memory (3), for example, an EPROM or EEPROM, to the processor (1). This memory serves as user memory and also contains user keys (CCCi) that are allocated to a given user and written in the hidden area (ZS). The memory (3) is divided into a hidden area (ZS) through which read or write access can only be made using the microprocessor (1) under the control of the operating system (OS). Access to other memory areas (3) can be made from the processor (1) or from the outside using a link (8) to obtain the data contained in this memory and in a memory access management algorithm as a part of the operating system (OS). This architecture is described in further detail in French patent application FR 2 401 459 (U.S. Pat. No. 4,211,919) and FR 2 461 301 (U.S. Pat. No. 4,382,279), incorporated herein by reference. The card's microprocessor (1) is also linked through bus (5) to a RAM type read-write memory (4). The card's circuits are connected with the outside world and receive certain commands or data that are necessary for the link (8) to function. In addition to the operating system (OS), the program memory (2) also contains the memory access management algorithm and allows the user to differentiate between access in a hidden area and to verify that the instruction to be executed is compatible with the means of access to this area and to other programs whose respective functions are described below.

The A.S.C.C. coding and decoding program contains the specific key coding-decoding algorithm. The function of this program will be discussed later.

The A.CA.S.C. dependent data calculation program can be a checksum calculation algorithm, a cyclic redundancy check (CRC), an algorithm that determines the number of key bits that have a given logical value or an algorithm that determines a base signature of a hidden key (CS).

Finally, an A.CU program is a user key coding-decoding algorithm, that can be used to encode or to decode.

When delivered, the card contains a specific coded protection key (C.SP.Di.) that is written into the card's hidden area (ZS). This specific key (C.SP.Di.) has been calculated using the base key by a randomization algorithm and can be protected by using the A.CA.S.C. program. In addition, the procedure described in BULL patents FR 2 600 190 and FR 2 601 795 (U.S. Pat. No. 4,811,393) can be used as a randomization process.

Figure 3:
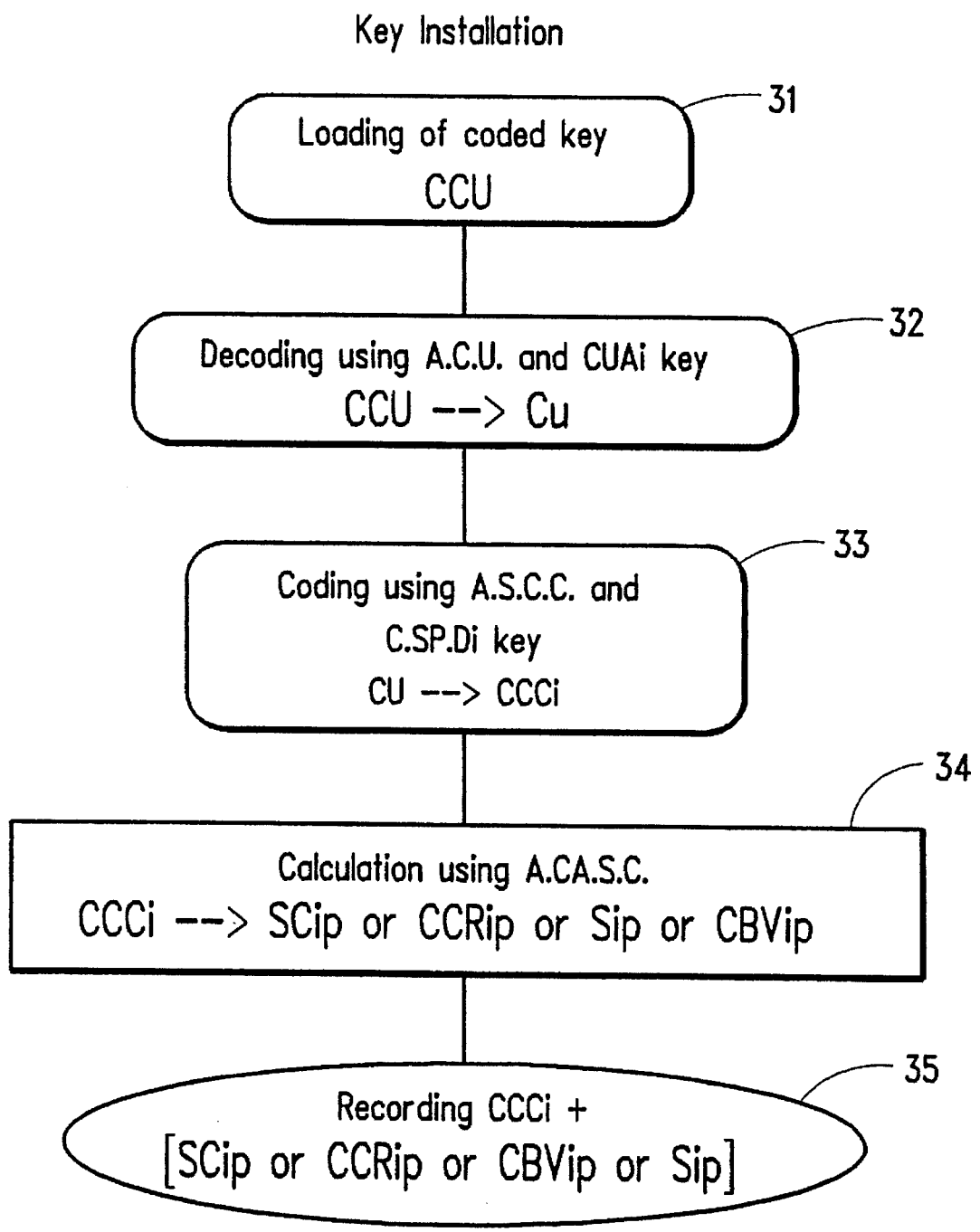
FIG. 3 represents the procedure for installing keys in the unit.

When an organization wishes to load the card with a user key, they connect the card to a terminal that transmits a coded user key (CCU) or an uncoded user key (CU) with that key's loading instruction (31 FIG. 3) to the card's microprocessor (1) using bus (6). If the key is coded, the operating system (OS) will call the A.CU. algorithm and a corresponding user key (CUAi) when this instruction is executed in order to decode (according to step 32) this coded key (CCU) into an uncoded user key (CU). Then, the operating system (OS) activates step 33. If the user key is not coded, the operating system executes the specific key coding algorithm (A.S.C.C.) using a specific random key (C.SP.Di.) in order to allow the microprocessor (1) to encode the user key (CU) into a called coded key (CCCi). As soon as this algorithm has been executed, it returns control to the operating system (OS). The operating system initiates step 34 in order to execute the dependent data calculation algorithm. It must be noted that the coded user key (CCU) was furnished by a secured outside party using the same key coding algorithm (ACU) and the same associated user key (CUAi).

The microprocessor (1) executes this dependent data calculation algorithm and calculates a checksum (SCip) or a cyclic redundancy code (CCRip) that contains protection data, a signature (Sip) or a count of the key bits that have the same value (CBVip). This protection data (SCip or CCRip or Sip or CBVip) is associated with the coded key (CCCi) either directly in a hidden memory area (3) or by establishing a link between the coded key (CCCi) and the protection data (SCip or CCRip or Sip or CBVip) using the operating system (OS).

For this process, the link will be given a unique identifier by the memory access management algorithm. Thus, the coded key (CCCi) can be stored in the hidden area (ZS) when the protection data (SCip or CCRip or Sip or BVip) is stored elsewhere in memory (3). For example, it can be stored in an area defined by an intervening index in the memory access management algorithm at the key's address (CCCi). For a checksum calculation, the A.CA.S.C. algorithm can be an addition instruction for the set of coded key bytes (CCCi). In this example the results of the operation consist of protection data that represents the keys in the form of a supplementary byte in a space designated for the memory access management algorithm, or in the same storage location.

Figure 2:
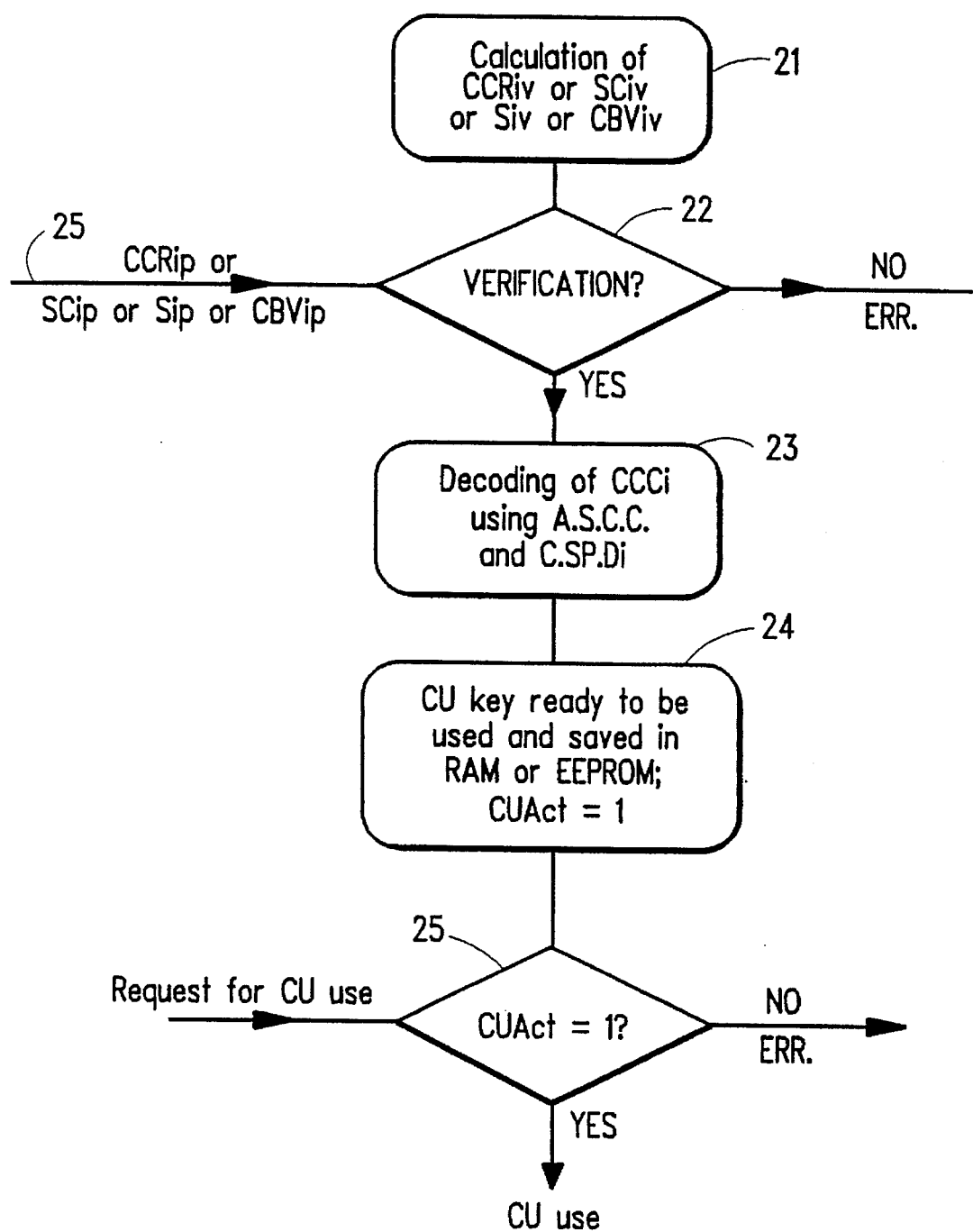
FIG. 2 is a diagram of the unit's operational algorithm as described in the patent.

This process can be executed systematically for each key stored which is in the hidden memory area, and allows the user to execute the following procedure:

When the card is in operation, the terminal sends a command that calls a key (a coded user key—CCCi, for example) to the microprocessor (1) for an assurance verification operation (see BULL French patent application number 2 601 476, FR 2 601 535, FR 2 592 510 (U.S. Pat. No. 4,825,052). The operating system (OS) searches for the key (CCCi) in the hidden area (ZS) and executes a checksum algorithm by initiating step 21 (the A.CA.S.C. algorithm) of FIG. 2. The verification data (CCRiv or SCiv or Siv or CBViv) is calculated and compared at step 22 of FIG. 2 to the protection data (25) (CCRip or SCip or Sip or CBVip) that was stored when the user coded key was stored. If the verification data, resulting from the calculation performed by the A.CA.S.C. algorithm (represented in step 21), is not identical to the protection data, the microprocessor (1) will generate an error signal and display an error message on the terminal or invalidate the key (CCCi). If the verification operation passes successfully (the comparison was positive), step 23 of FIG. 2 will be executed. This step decodes the coded key (CCCi) using the specific key coding algorithm (A.S.C.C.) and the specific random key (C.SP.Di.). This algorithm (A.S.C.C.) is stored in ROM memory (2) and will not be accessible to the user or to the terminal. This algorithm (A.S.C.C.) is executed using the C.SP.Di. key, and the microprocessor (1) returns the user key (CU) as a result. This user key (CU) is then saved in step 24 either in RAM (4) or in the EEPROM (3) in an unhidden area so that it may be reused in the assurance verification control procedure mentioned above. A save procedure is executed throughout the duration of a session, or the duration of card's connection to the terminal. A saved user key (CU) can only be used if it results from a calculation made during the same session. This is expressed by an active indicator (CUAct). For example, by setting it to 1 in order to show that the key (CU) is active and indicate that it has been calculated during the same session.

This indicator (CUAct) is always reset to zero at the beginning of a session. Before using a user key (CU) in a calculation, test step 25 must be executed in order to determine if the indicator (CUAct) has the required value of "1". If the indicator does have this value, the user calculation (CU) is executed. Otherwise, the card will generate an error signal that returns control to the terminal and allows the user to activate the user key's determination sequence.

Any modifications or improvements within reach of craftsmen are an integral part of the spirit of this invention.

What is claimed is:

1. A user key protection device for a smart card comprising:

at least one user coded key stored within said smart card, said at least one user coded key is coded (CCCi) using a specific key specific to each smart card, a user key, and a user key coding/decoding algorithm (A.S.C.C.) executed by a microprocessor within said smart card;

protection data corresponding to dependent data of each of said at least one user coded key generated and stored in association with a respective at least one user coded key (CCCi) in a memory area of said smart card;

a detection device installed in said smart card allowing the smart card to verify integrity of said at least one user coded key (CCCi) by comparing said protection data to verification data generated using the at least one user coded key (CCCi); and an interlock device installed in the smart card allowing the smart card to block any further calculation using the at least one user coded key (CCCi) in the event that said verification data is not identical to said protection data.

2. The device according to claim 1, wherein said protection data is stored in a hidden memory area of said smart card.

3. The device according to claim 1 wherein said detection device contains key correction features therein.

4. The device according to claim 1, wherein said protection data is a checksum.

5. The device according to claim 1, wherein said protection data is a cyclic redundancy check (CRC).

6. The device according to claim 1, wherein said protection data is a number of user coded key (CCCi) bits (CBVip), each having a given binary value.

7. The device according to claim 1, wherein said protection data is a signature (Sip) calculated using a secret key (CS).

8. The device according to claim 1, wherein said detection device is an algorithm (A.CA.S.C.) executed by said microprocessor (1) contained within said smart card.

9. The device according to claim 1, wherein a decoded key is generated from said at least one user coded key using said user key coding/decoding algorithm (A.S.C.C.) if said verification data is identical to said protection data, said user key coding/decoding algorithm using said specific key (C.SP.Di) and a key storing operation is executed by said microprocessor for making said decoded key available in said memory area.

10. The device according to claim 1, wherein said user key is sent to the smart card as coded by an input key coding/decoding algorithm (A.C.U.) and said device includes said input key coding/decoding algorithm and is arranged for decoding said coded user key into a decoded user key to be coded by said user key coding/decoding algorithm (A.S.C.C).

11. The device of claim 10, wherein said user key coding algorithm (A.S.C.C.) is different from said input key coding/decoding algorithm and is stored in a hidden memory area of said smart card.

12. A process for storing at least one user coded key in a smart card, comprising the steps of:

receiving a user key;

coding said user key into a user coded key using a specific key specific to each smart card and a user key coding/decoding algorithm (A.S.C.C.) executed by a microprocessor within said smart card;

calculating protection data using said user coded key and a test algorithm (A.C.A.S.C.) executed by said microprocessor; and storing said user coded key in association with said protection data in a memory area of said smart card.

13. The process according to claim 12, wherein said user key (CU) is sent to the smart card as coded by an input key coding/decoding algorithm (A.C.U.), said process further comprising the steps of:

decoding said coded user key (CCU) into a decoded user key (CU) by using said coding/decoding algorithm (A.C.U.) executed by said microprocessor; and coding said decoded user key (CU) into said user coded key (CCCi) by executing said user key coding/decoding algorithm (A.S.C.C.).

14. The process according to claim 12, further comprising the steps of:

calculating verification data using said test algorithm on said user coded key in the microprocessor prior to executing a calculation using said user coded key;

comparing said verification data to said protection data to ascertain integrity of said user coded key; and blocking use of said user coded key if said verification data is not identical to said protection data.

\* \* \* \* \*